Sept. 20, 1966 S. MOSKOWITZ 3,274,380

OPTICAL-ANALOG INTEGRATOR

Filed May 4, 1962

INVENTOR.
SAUL MOSKOWITZ
BY
OSTROLENK, FABER, GERB & SOFFEN
ATTORNEYS

United States Patent Office 3,274,380

Patented Sept. 20, 1966

3,274,380
OPTICAL-ANALOG INTEGRATOR

Saul Moskowitz, Brooklyn, N.Y., assignor to Kollsman Instrument Corporation, Elmhurst, N.Y., a corporation of New York Filed May 4, 1962, Ser. No. 192,526
2 Claims. (Cl. 235—183)

My invention relates to a novel integration system, and more specifically relates to an integration system for evaluating integrals of the form:

$$M = \int_A f(x,y) I(x,y)\, dx\, dy \qquad \text{(I)}$$

where the integral is performed over the finite area A, and;

$f(x,y)$ represents a selected given non infinite function of $x$ and $y$ over the area A $I(x,y)$ represents a variable intensity distribution over the area A $dx$ and $dy$ are the variables of integration over the area A.

Automatic pattern recognition systems are known which use the concept of function-ensemble-averaging. That is to say, the system involves the use of averages of various functions over a given intensity distribution as in a map to uniquely represent the distribution. In this manner, a predetermined pattern can be recognized as to aid the guidance of a missile or similar device, or to serve as the error sensor for a positional or guidance servo-loop, or generally to compute generalized coordinate displacement information.

As is discussed in my copending application Serial No. 192,456, filed May 4, 1962, entitled Automatic Pattern Recognition System and assigned to the assignee of the present invention, if $x$ and $y$ are the set of coordinates of a particular pattern or map, the intensity distribution function over a bounded area A can be written $I(x,y)$. The average intensity over the entire region M may be written as:

$$M = \int_A I(x,y)\, dx\, dy$$

If $f(x,y)$ is some particular function, then the ensemble-average of this function over area A will take the form shown in Equation (I).

It can be mathematically shown that such expressions can form sets which uniquely characterize an intensity distribution. Thus, it is possible to identify a given configuration, or measure a displacement against a given configuration, in terms of such averages.

The problem remains to evaluate integrals in the form of Equation (I) when the information is obtained.

The principal object of the present invention is to provide a novel optical-analog integrator for evaluating such integrals.

Another object of this invention is to provide a novel optical-analog integrator which operates with real time operation.

A further object of this invention is to provide a novel optical-analog integrator which can be incorporated in automatic pattern recognition computers.

A still further object of this invention is to provide a novel optical-analog integrator for evaluating integrals of the form expressed in Equation (I) which does not use moving parts and which has high reliability.

A further object of this invention is to provide a novel optical-analog integrator for automatic pattern recognition computers which can operate with almost any form of intensity source.

A still further object of this invention is to evaluate inegrals of the form given in Equation (I) without the use of digital or mechanical-analog computers.

These and other objects of my novel invention will become apparent from the following description when taken in connection with the drawings, in which.

Figure 1:
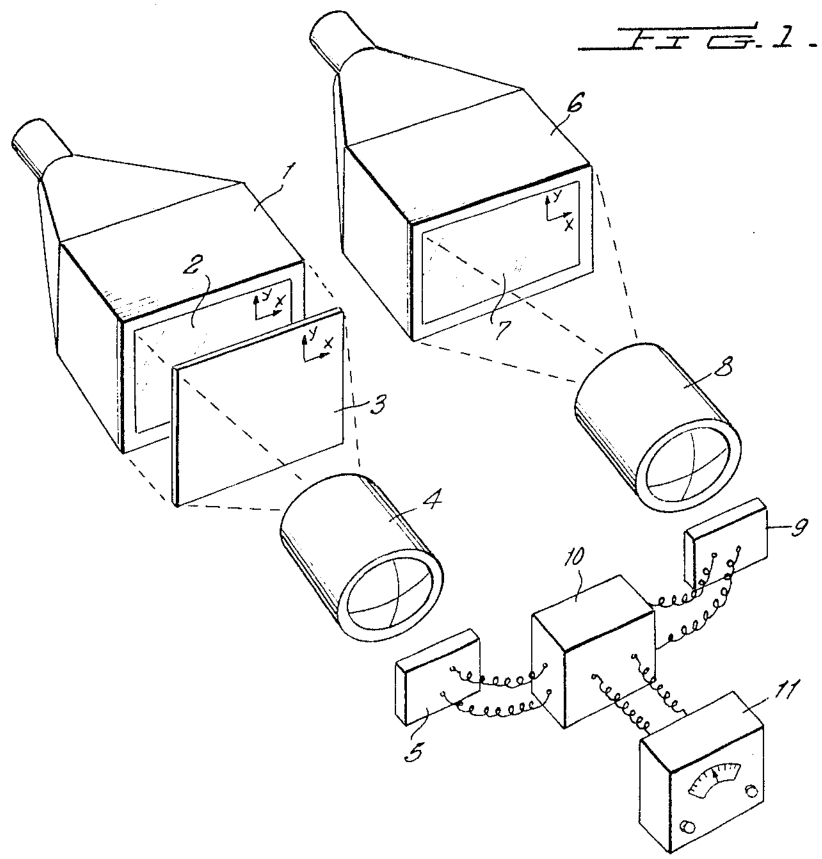
FIGURE 1 is an exploded perspective view of an illustrative embodiment of the invention.

The principle of the present invention is to utilize the intrinsic property of a neutral density filter which will reduce the intensity of transmitted light by some fraction which varies between zero and 1. If the intensity of the incident light is I, and the intensity of the transmitted light is I′, and nonreflective coatings are used to yield essentially zero reflection, and 1/K the transmission of the filter, then $$I' = (1/K) I \qquad \text{(III)}$$

I may be a time or space varying intensity function without changing the validity of Equation (III). In a similar manner, the transmission factor 1/K may also be time or space varying.

In particular, at any instant of time, let I be a two dimentional space varying function $I(x,y)$ and $I/K$ a two dimensional space varying function $1/K(x,y)$. Then, $$I'(x,y) = (1/K(x,y) I(x,y) \qquad \text{(IV)}$$

Now $1/K(x,y)$ can only assume values between 0 and 1 because it represents a variable density filter. However, the only requirements upon the function $f(x,y)$ of Equation (I) is that it remains finite over the area interest. It is always possible to write $f(x,y)$ in the form:

$$f(x,y) = C(1/K(x,y) + D \qquad \text{(V)}$$

A constant D must be chosen so that Equation (V) is true, even though the item $C(1/K(x,y))$ cannot be both positive at some points in the given area and negative at others, and in particular has zero as its least value. The constant C is so chosen so that $1/K(x,y)$ has a maximum value of unity. Equation (I) is then written:

$$M = \int_A [C(1/K(x,y) + D] I(x,y)\, dx\, dy$$
$$= C\int_A (1/K(x,y) I(x,y)\, dx\, dy + D\int_A I(x,y)\, dx\, dy \qquad \text{(VI)}$$

A typical example of the manner in which the constant C is chosen is as follows:

The constant D is defined by the equation $$f(x,\ y) = C\left(\frac{1}{k(x,\ y)}\right) + D$$

where the only restriction on $f(x,y)$ is that it remains finite throughout the acceptable region of $x,y$. The quantity $1/k(x,y)$ can only have values between 0 and 1 if it is to be represented by an optical filter. To indicate how the constants C and D are chosen, the following numerical example is presented: let $f(x,y) = xy$ with the area of interest defined by $$-Z \leq x \leq +2$$
$$-Z \leq y \leq +2$$

Thus $f(x,y)$ can take on values between $-4$ and $+4$.

Now $$C\left(\frac{1}{k(x,\ y)}\right)$$

can only be zero or positive for all $x,y$. Arbitrarily select its minimum value to be zero. The Equation (IV) for the minimum value of $f(x,y)$ becomes $-4 = 0 + D$.

Thus; $D = -4$.

(Note that if it had been arbitrarily decided that $C(1/k(x,y))$ was to have been $+2$, an engineering decision rather than a theoretical requirement, then D would have been $-6$.)

The solution for C and $k(x,y)$ is as follows:

Equation (IV) after the selection of D for the function $f(x,y) = xy$ can now be written $$x,\ y = C\left(\frac{1}{k\,(x,\ y)}\right) - 4$$

Solving for $1/k(x,y)$ $$1/k(x,\ y)=\frac{xy+4}{C}$$

If $1/k(x,y)$ is not to exceed the value 1 for the maximum value of $xy$ which is $+4$, then, $1=4+4/C$ or $C=8$. Finally defining the function $k(x,y)$ as, $k(x,y)=8/xy+4$, this procedure can be applied similarly to any function of interest.

The present invention provides a mechanization of Equation (VI), and hence Equation (I).

Referring now to FIGURE 1, I have provided a primary image source 1 such as the screen of a television-type display which reproduces a particular field of view. The screen 2 of image source 1 will have an intensity distribution $I(x,\ y)$ over its area A. It is to be noted that the image presented on screen 2 can be from any source such as a television system as described, or a photographic transparency, or any other source.

A filter 3 is then placed over the image display 2 where the filter 3 is an optical filter which represents the function $1/K(x,\ y)$. Thus, the image, as viewed through filter 3 will represent the product:

$$(1/K(x,y))I(x,y) \tag{VII}$$

This image is viewed by an optical system 4 which includes, for example, a condensing lens system which focuses a reduced image of screen 3 (which would be equivalent to the value of Equation (VII)) upon a photosensitive device 5 which could, for example, be a photovoltaic cell. The cell 5 will measure the total incident intensity applied thereto and, therefore, in effect, integrates the total image applied over its photosensitive surface. The output of the cell will then be a generated voltage which will represent the integral $$\int_A (1/K(x,y))I(x,y)dxdy \tag{VIII}$$

A second image source 6 is then provided which presents the same image on its screen 7 as does the primary image source 1. The image provided over area A of screen 7 is then viewed by the condensing lens system 8, and focused upon a second photovoltaic cell 9. It will be noted that the second image source is directly applied to photocell 9, there being no filter between the screen 7 and photosensitive device 9, whereupon the output signal of the photovoltaic device 9 will be:

$$\int_A I(x,y)dxdy \tag{IX}$$

The two signals of photovoltaic cell 5 and photovoltaic cell 9 respectively clearly represent the two parts of Equation (VI), whereupon the addition of the two voltages with appropriate amplification to represent constants C and D is achieved in appropriate summation network 10. The output of summation network 10, which is a unique figure, is then applied to the read-out meter 11 or any other appropriate control circuitry.

Figure 2:
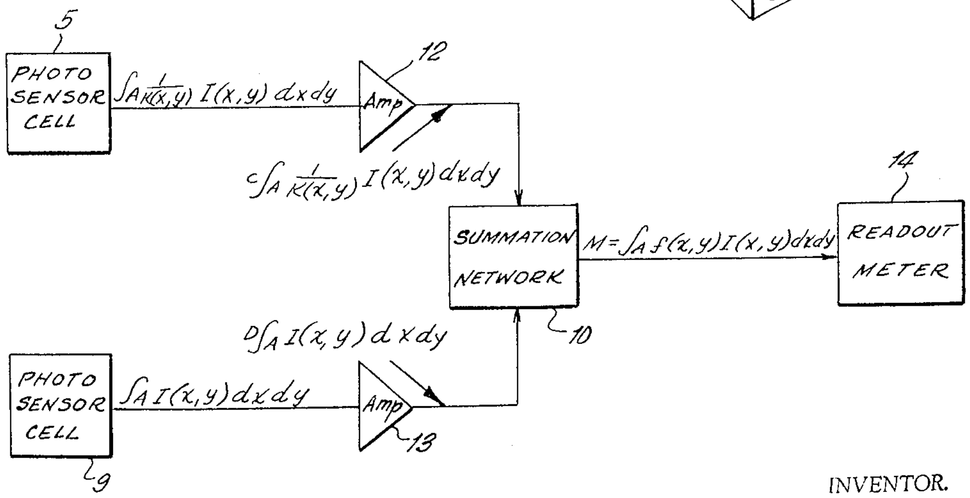
FIGURE 2 is a functional schematic diagram of the system of FIGURE 1.

A functional schematic diagram of the system of FIGURE 1 is shown in FIGURE 2 where the photosensitive device 5 generates Equation (VIII) into an amplifier 12 which has an output equal to the function of Equation (VIII) multiplied by the constant C which is determined by its amplification factor.

In a similar manner, photosensitive device 9 has an output which is related to Equation (IX) which is applied to an amplifier 13, again to be amplified to represent the appropriate multiplication by the constant D. The two outputs of amplifiers 12 and 13 are then added in the summation network 10 so that the total output signal from summation network 10 is Equation (I) which is connected to read-out meter 14.

Any other consistent read-out method, such as meter, recorder, oscilloscope, etc., would, of course, be usable to present the integral which is to be evaluated by the novel system.

Although I have described preferred embodiments of my novel invention, many variations and modifications will now be obvious to those skilled in the art, and I prefer, therefore, to be limited not by the specific disclosure herein but only by the appended claims.

I claim:

1. An optical-analog integrator for evaluating integrals of the form:

$$M=\int_A f(x,y)I(x,y)dxdy$$

wherein $f(x,y)$ is a noninfinite function of variables $x$ and $y$ over an area A, and $I(x,y)$ is a variable intensity distribution over the area A comprising first means for producing an image of an object, second means for producing an image of said object, an optical filter having a variable density, and first and second photosensitive means responsive to the intensity of radiation from said first and second image-producing means; said optical filter being interposed between said first image-producing means and its said respective photosensitive device; the output of said first and second photosensitive devices each being connected to amplifying means and a common summation means; the output of said summation means being equivalent to the evaluation of said integral; said optical filter representing the function $1/K(x,y)$ over the area of said first means for producing an image; said first photosensitive device having an output related to:

$$\int_A (1/K(x,y))I(x,y)dxdy$$

said second photosensitive device related to: $\int_A I(x,y)dxdy$.

2. An optical-analog integrator for evaluating integrals of the form:

$$M=\int_A f(x,y)I(x,y)dxdy$$

wherein $f(x,y)$ is a noninfinite function of variables $x$ and $y$ over an area A, and $I(x,y)$ is a variable intensity distribution over the area A comprising first means for producing an image of an object, second means for producing an image of said object, an optical filter having a variable density, and first and second photosensitive means responsive to the intensity of radiation from said first and second image-producing means; said optical filter being interposed between said first image-producing means and its said respective photosensitive device; the output of said first and second photosensitive devices each being connected to amplifying means and a common summation means; the output of said summation means being equivalent to the evaluation of said integral; said optical filter representing the function $1/K(x,y)$ over the area of said first means for producing an image; said first photosensitive device having an output related to:

$$\int_A (1/K(x,y))I(x,y)dxdy$$

said second photosensitive device related to:

$$\int_A I(x,y)dxdy$$

said amplifier means in said summation network means producing multiplication of said respective functions by predetermined constants.

References Cited by the Examiner

UNITED STATES PATENTS

| | | | |
|---|---|---|---|
| 2,656,106 | 10/1953 | Stabler. | |
| 2,857,798 | 10/1958 | Seliger | 340—19 X |
| 2,964,644 | 12/1960 | Hobrough. | |
| 3,004,464 | 10/1961 | Leighton et al. | |
| 3,064,519 | 11/1962 | Shelton. | |
| 3,089,917 | 5/1963 | Fernicola | 178—6.5 |
| 3,111,666 | 11/1963 | Wilmotte | 235—181 X |
| 3,144,554 | 8/1964 | Whitney | 250—208 |
| 3,195,396 | 7/1965 | Horwitz et al. | 340—146.3 X |

FOREIGN PATENTS

| | | |
|---|---|---|
| 152,130 | 2/1962 | U.S.S.R. |

MALCOLM A. MORRISON, *Primary Examiner.*

I. KESCHNER, K. DOBYNS, *Assistant Examiners.*